No. 767,162. Patented August 9, 1904.

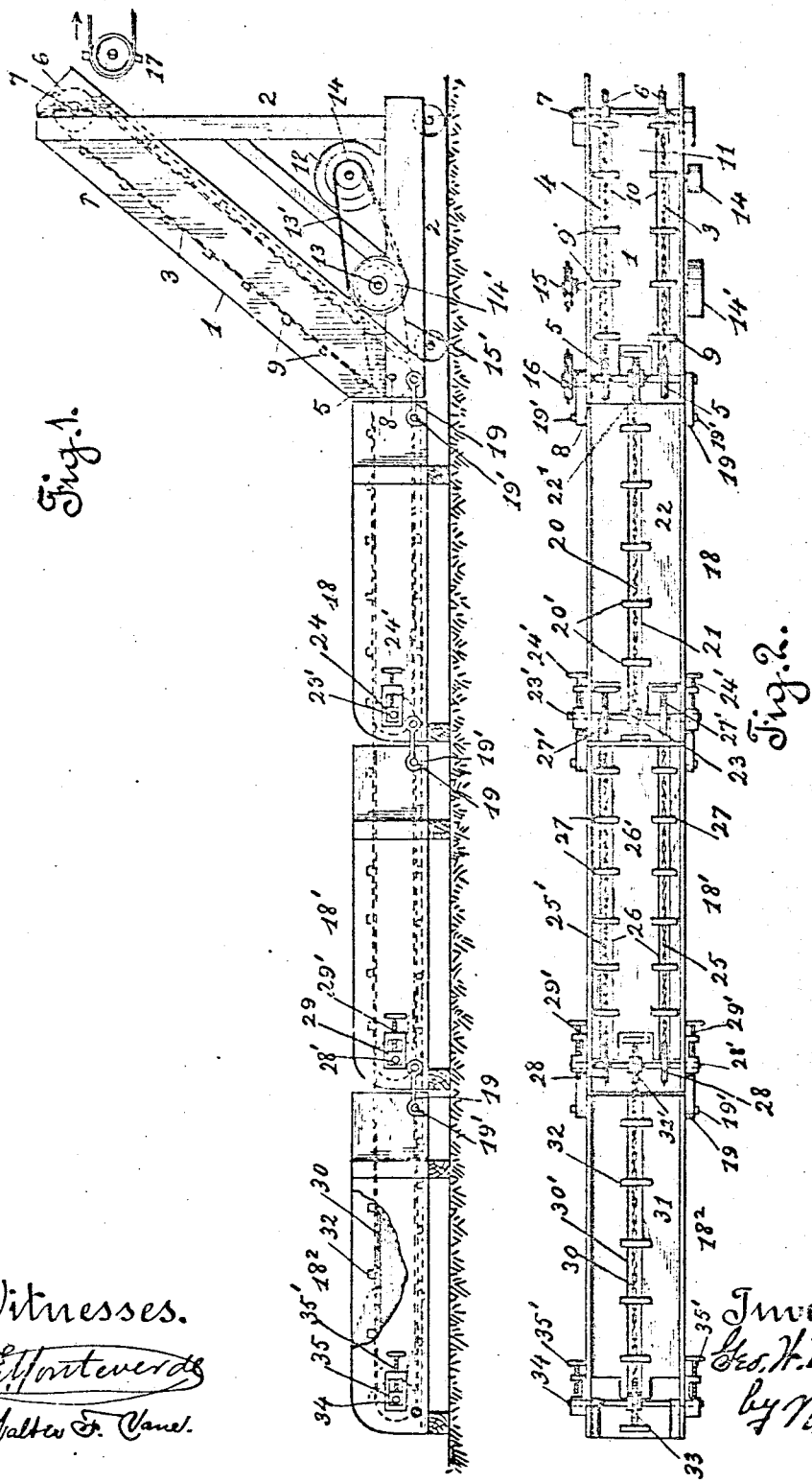

UNITED STATES PATENT OFFICE.

GEORGE W. McNEAR, JR., OF OAKLAND, CALIFORNIA.

TRANSPORTING APPARATUS FOR GRAIN.

SPECIFICATION forming part of Letters Patent No. 767,162, dated August 9, 1904.

Application filed June 29, 1903. Serial No. 163,480. (No model.)

*To all whom it may concern:*

Be it known that I, GEORGE W. MCNEAR, Jr., a citizen of the United States, residing at Oakland, county of Alameda, State of California, have invented certain new and useful Improvements in Transporting Apparatus for Grain; and I do hereby declare the following to be a full, clear, and exact description of the same.

The present invention comprises means whereby the sacks of grain may be quickly transported from distant points of a wharf or warehouse to a common place of deposit, either for piling the sacks of grain or delivering the same for discharge into a vessel, the object of the invention being to avoid the expense of handling the grain by means of trucks during the work of moving the sacks.

To comprehend the invention, reference should be had to the accompanying sheet of drawings, wherein—

Figure 1 is a side view of the grain-elevator with a series of trailer-sections united thereto, and Fig. 2 is a top plan view of the mechanism disclosed by Fig. 1 of the drawings.

The numeral 1 is used to indicate an inclined trough or runway which is mounted upon a portable frame or platform 2. Within the trough or runway 1 is arranged the endless conveyers or elevators 3 4, which work over the sprocket-wheels 5 6, secured to the cross-shafts 7 8, working in bearings at the upper and lower end of the trough or runway 1. These endless conveyers or elevators 3 4 are provided with a series of properly-spaced blocks or cleats 9, which work through and project above the longitudinal openings 10, formed in the bottom 11 of the trough or runway 1. The endless conveyers or elevators are driven by any suitable means, preferably through the medium of an electric motor 12, mounted upon the platform or frame 2. This motor drives a cross-shaft 13 through the medium of the belt 13', working over the pulleys 14 14'. To the end of the shaft 13 opposite to that carrying the pulley 14' is secured the sprocket-wheel 15. The motion of the shaft 13 is transmitted to drive the lower shaft 8 by means of a sprocket-chain 15', working over the sprocket-wheel 15 and the sprocket-wheel 16, secured to one end of the drive-shaft 8 for the endless conveyers or elevators 3 4. By this connection the power of the motor 12 is transmitted to drive said conveyers or elevators 3 4. By reason of the upwardly-projecting cleats or blocks 9 a sack of grain as delivered into the trough or runway 1 is held therein while being carried to the upper end thereof by the action of the conveyers or elevators to be delivered to a workman stationed at such point to receive the sacks or onto an endless conveyer 17 for delivering the sacks to a distant place of deposit.

To the lower end of the chute or trough 1 a series of connected runways or chutes, which I shall term "trailer-sections" or "runways" 18 18' 18², are united. In the drawings three trailer-sections are illustrated; but it will be understood that the number may be increased or decreased at will. The object of these trailers is to permit of the sacks of grain being taken from different places at increased distance from the lower end of the chute or runway 1. The said sections are coupled or united in the same manner as the section 18 is connected to the chute 1, which is by means of a hinged hook 19 at each side of the chute or trough 1 engaging with studs 19', laterally projecting from the sides of the forward end of section 18. At the opposite end of section 18 the hooks are hinged, which engage with studs laterally projecting from the forward end of the opposing section. Within section 18 works an endless conveyer 20, which carries spaced cleats or blocks 20'. The conveyer works through a central opening 21 in the bottom of the runway, the blocks or cleats 20' working over the surface of the bottom 22. The endless conveyer 20 is driven from the shaft 8 by means of the sprocket-wheel 22', mounted thereon, over which wheel and sprocket-wheel 23, secured to cross-shaft 23', the conveyer works. The shaft 23' is located at the rear end of the trailer-section 18, working in the slide bearing-boxes 24. These boxes are adjusted to regulate the tension of the conveyer by means of the take-up screws 24'.

The trailer-section 18' is provided with two endless conveyers 25 25', which work through longitudinal slots 26, formed in the bottom 26'. These conveyers, like the conveyer 20, are provided with spaced cleats or blocks 27, which work over the surface of the bottom 26'. Said conveyers are driven from the cross-shaft 23' by means of the sprocket-wheels 27', over which sprocket-wheels and the sprocket-wheels 28 the endless conveyers work. The sprocket-wheels 28 are secured to the cross-shaft 28', working in the slide bearing-boxes 29, located at the outer end of the trailer-section 18', which slide-boxes are adjusted to regulate the tension of the conveyers 25 25' by means of the take-up screws 29'.

Like section 18 the trailer-section 18² is provided with a single endless conveyer 30, which works within a longitudinal slot 30', cut in the bottom 31 of the said section. This conveyer, like the others, has attached thereto a series of cleats or blocks 32, which work over the bottom 31. Said endless conveyer 30 is driven from the shaft 28' by means of the sprocket-wheel 32', secured to said shaft between the sprocket-wheels 28. Over the sprocket-wheel 32' and the sprocket-wheel 33 works the endless conveyer 30, said sprocket-wheel 33 being secured to the cross-shaft 34, working within slide bearing-boxes 35 at the outer end of the trailer-section 18². The tension of the conveyer 30 is controlled by the take-up screws 35'.

By the described connections it is obvious that the drive-motor 12 has its motion imparted or transmitted for the operating of all of the conveyers. Hence the moment a sack of grain is placed into the last section 18² it is immediately caught by the cleats of said section-conveyer and propelled through the section and delivered into the section 18'. In said section it is received by the cleats of its endless conveyer and propelled through the section and delivered onto the endless conveyer of section 18, which conveys the same forward until delivered onto the endless conveyers or elevators of the chute or trough 1. When received into said chute or trough, the same is conveyed to the top thereof and delivered to a workman there located to receive the sacks for piling or delivered onto the endless conveyer 17 for delivery at a distant point or place of deposit.

To disconnect either of the trailer-sections, the hinged hooks 19 are released from the laterally-projecting studs 19' of the section to be cut out and one of the links of the endless conveyer or conveyers of the said section opened. The endless conveyer or conveyers, as the case may be, is then released from its drive sprocket-wheel.

By the described system the length of the transporting apparatus may be increased at will in order to place the receiving end thereof within convenient reach of the workman handling or loading the sacks of grain, thereby overcoming the necessity of trucking the sacks a distance within the warehouse.

As the chute or trough 1 is mounted upon a movable or portable frame or support the same may be readily shifted from place to place in order to handle the grain to the best advantage with the least expense in the handling thereof.

Having thus described the invention, what I claim as new, and desire to protect by Letters Patent, is—

1. In a grain-transporting apparatus, an inclined runway having oppositely-disposed extended portions at the respective sides of its lower end, rollers upon the extended portions, an endless conveyer mounted upon the runway, including chains operatively associated with said rollers, a supplemental roller arranged intermediate said extended portions of the runway, having its axis in alinement with the axis of the first-mentioned rollers, in combination with a trailer-section having a conveyer thereon, including a chain operatively associated with said supplemental roller.

2. In a grain-transporting apparatus, a runway and a trailer-section, endless carriers upon both, said runway having a cut-away portion at its end adjacent the trailer-section, a roller within the cut-away portion operatively associated with the carrier upon the trailer-section, and a supplemental roller upon the runway arranged in axial alinement with the first-mentioned roller and operatively associated with the carrier upon the runway, whereby the grain will have an uninterrupted feed from one section to the other.

3. In a grain-transporting apparatus, an inclined runway, having a grooved bottom section, an endless conveyer mounted upon the runway, comprising a chain arranged within the grooved portion, and transversely-arranged cleats on the chain extending beyond the opposite sides of the groove and slidably engaging the upper surface of said bottom section, in combination with a trailer-section, having an endless conveyer arranged within a grooved portion thereof and communicating with the first-mentioned conveyer, and an operating-shaft adjacent the contiguous ends of the runway and trailer-sections and common to both the endless carriers.

4. In a grain-transporting apparatus, a runway and a trailer-section, endless carriers upon both, said runway having a cut-away portion at its forward end adjacent the trailer-section, a roller within the cut-away portion operatively associated with the carrier upon the trailer-section, a supplemental roller upon the runway arranged in axial alinement with the first-mentioned roller and operatively associated with the carrier upon the runway, and an operating-shaft common to both of said rollers.

5. In a grain-transporting apparatus, a runway and a trailer-section, endless carriers upon both, said runway having a cut-away portion at its end adjacent the trailer-section, a roller arranged within the cut-away portion and operatively associated with the carrier upon the trailer-section, a supplemental roller upon the runway arranged in axial alinement with the first-mentioned roller and operatively associated with the carrier upon the runway, an operating-shaft common to both of said rollers, and hooks adjacent said rollers for detachably connecting the sections.

In witness whereof I have hereunto set my hand.

GEORGE W. McNEAR, Jr.

Witnesses:
 HENRY C. DROGER,
 JAMES L. KING.